(12) United States Patent
Mihan et al.

(10) Patent No.: US 7,517,938 B2
(45) Date of Patent: *Apr. 14, 2009

(54) LOOP REACTOR WITH VARYING DIAMETER FOR OLEFIN POLYMERIZATION

(75) Inventors: Shahram Mihan, Bad Soden (DE); Wolfgang Gsella, Köln (DE); Peter Kölle, Köln-Rodenkirchen (DE); Joachim Wulff-Döring, Frankenthal (DE); Markus Meierhöfer, Hürth (DE)

(73) Assignee: Basell Polyolefine GmbH, Wesseling (DE)

( * ) Notice: Subject to any disclaimer, the term of this patent is extended or adjusted under 35 U.S.C. 154(b) by 377 days.

This patent is subject to a terminal disclaimer.

(21) Appl. No.: 10/572,817

(22) PCT Filed: Sep. 16, 2004

(86) PCT No.: PCT/EP2004/010376

§ 371 (c)(1),
(2), (4) Date: Mar. 22, 2006

(87) PCT Pub. No.: WO2005/028098

PCT Pub. Date: Mar. 31, 2005

(65) Prior Publication Data

US 2008/0119624 A1    May 22, 2008

Related U.S. Application Data

(60) Provisional application No. 60/532,411, filed on Dec. 16, 2003, provisional application No. 60/543,359, filed on Feb. 10, 2004.

(30) Foreign Application Priority Data

Sep. 24, 2003  (DE) ................. 103 44 501
Dec. 22, 2003  (DE) ................. 103 61 156

(51) Int. Cl.
*C08F 2/12* (2006.01)
*B01J 19/18* (2006.01)

(52) U.S. Cl. ............... 526/64; 526/65; 422/132
(58) Field of Classification Search ............ 526/64, 526/65; 422/132
See application file for complete search history.

(56) References Cited

U.S. PATENT DOCUMENTS

| 4,978,648 A | 12/1990 | Barbe et al. ........... 502/127 |
| 5,455,216 A | 10/1995 | Mueller et al. .......... 502/256 |
| 5,625,013 A | 4/1997 | Mueller et al. .......... 526/106 |
| 6,239,235 B1 | 5/2001 | Hottovy et al. ............ 526/64 |
| 6,319,997 B1 | 11/2001 | Kendrick et al. ............ 526/64 |
| 6,355,741 B1 | 3/2002 | Marechal .................. 526/64 |
| 6,476,161 B1 * | 11/2002 | Harlin et al. ............... 526/65 |
| 6,645,900 B2 | 11/2003 | de Lange et al. ........... 502/87 |
| 6,699,947 B1 | 3/2004 | Evertz et al. ............. 526/106 |
| 7,033,545 B2 * | 4/2006 | Kufeld et al. ............. 422/135 |
| 2004/0038810 A1 | 2/2004 | Mihan et al. ............. 502/224 |

FOREIGN PATENT DOCUMENTS

| DE | 905547 | 3/1954 |
| EP | 517868 | 11/1995 |
| EP | 589350 | 1/1997 |
| EP | 1195388 A1 * | 4/2002 |
| GB | 1482148 | 10/1974 |
| WO | 97/04015 | 2/1997 |
| WO | 01/17675 | 3/2001 |
| WO | 01/17676 | 3/2001 |
| WO | 01/18069 | 3/2001 |
| WO | 01/90204 | 11/2001 |
| WO | 2004/026463 | 4/2004 |
| WO | 2004/027264 | 4/2004 |

* cited by examiner

*Primary Examiner*—Fred M Teskin
(74) *Attorney, Agent, or Firm*—Shao-Hua Guo; William R. Reid

(57) ABSTRACT

Process for polymerizing at least one olefinic monomer selected from ethylene, propylene and 1-butene in a loop reactor in the presence of a polymerization catalyst at from 20 to 150° C., but below the melting point of a polymer to be formed, and a pressure of from 43 to 80 bar, where the polymer formed is present in a suspension in a liquid or supercritical suspension medium and wherein the suspension is circulated by means of an axial pump, wherein the polymerization is carried out at an average solids concentration in the reactor of more than 53% by weight, in the case of continuous product discharge, and at an average solids concentration in the reactor of more than 45% by weight, in the case of discontinuous product discharge, and wherein the polymerization is carried out at an ethylene concentration of at least 10 mol %, based on the suspension medium.

6 Claims, No Drawings

LOOP REACTOR WITH VARYING DIAMETER FOR OLEFIN POLYMERIZATION

This application is the U.S. national phase of International Application PCT/EP2004/010376, filed Sep. 16, 2004, claiming priority to German Patent Applications 10344501.3 filed Sep. 24, 2003, and 10361156.8, filed Dec. 22, 2003, and the benefit under 35 U.S.C. 119(e) of U.S. Provisional Application Nos. 60/532,411, filed Dec. 16, 2003; and 60/543,359, filed Feb. 10, 2004, the disclosures of International Application PCT/EP2004/010376, German Patent Applications 10344501.3 and 10361156.8 and U.S. Provisional Application Nos. 60/532,411 and 60/543,359, each as filed, are incorporated herein by reference.

The present invention relates to a process for polymerizing at least one olefinic monomer in a loop reactor at from 20 to 150° C., but below the melting point of the polymer to be formed, and a pressure of from 5 to 100 bar, where the polymer formed is present in a suspension in a liquid or supercritical suspension medium and this suspension is circulated by means of an axial pump.

Suspension polymerization processes for polymerizing olefins have been known for a long time. A suspension polymerization in which the polymerization is carried out in a loop reactor has been found to be particularly useful for the polymerization of ethylene in particular, usually together with further comonomers. In such loop reactors, the polymerization mixture is pumped continuously through a cyclic reactor tube. The pumped circulation firstly achieves continual mixing of the reaction mixture, and also distributes the catalyst metered in and the feed monomers in the reaction mixture. Secondly, the pumped circulation prevents sedimentation of the suspended polymer. The removal of the heat of reaction via the reactor wall is also promoted by the pumped circulation.

The polymer is generally discharged from the loop reactor in a discontinuous fashion in sedimentation legs. These sedimentation legs are projections which branch off vertically from the lower part of the reactor tube and in which the polymer particles can settle. After sedimentation of the polymer has reached a particular point, a valve at the lower end of the sedimentation legs is opened briefly and the polymer which has settled is discharged discontinuously.

Since loop reactors have been used for production purposes for many years, numerous efforts have been made to improve the economics of these reactors and the polymerization processes carried out therein. An increase in the space-time yield of the process is particularly desirable. The space-time yield is, in particular, limited by removal of the heat of reaction via the reactor wall and by the polymer content of the reaction suspension. An increase in the proportion of solids in the reactor will, in particular, make discharge of the polymer more effective and increase the mean residence time of the polymer in the reactor.

U.S. Pat. No. 6,239,235 describes a polymerization process in a loop reactor, in which an increase in the average proportion of solids in the reactor is achieved by means of a continuous discharge system. This continuous discharge system was able to achieve an average proportion of solids in the reactor of 53% by weight, whereas the conventional discontinuous discharge achieved an average solids concentration of only 45% by weight. In accordance with conventional teachings, the document makes no reference to a varying reactor diameter; in contrast, disturbance-free flow is said to be achieved by means of gentle curves. Only in the region of the impeller pump does there seem to be, apparently for reasons of impeller construction, a short widening of the reaction tube diameter. The process described in this document, too, leaves something to be desired in respect of the solids concentration in the reactor. The document also confirms the prevailing view that it is generally not possible to achieve polymer solids concentrations of more than 37-40 percent by weight in suspension polymerization processes.

It is an object of the present invention to find a process for polymerizing olefinic monomers in a loop reactor, which process makes higher solids concentration in the reactor and higher space-time yields possible.

We have found that this object is achieved by the process described at the outset wherein the polymerization is carried out at an average solids concentration in the reactor of more than 53% by weight, based on the total mass of the contents of the reactor, in the case of continuous product discharge and at an average solids concentration in the reactor of more than 45% by weight, based on the total mass of the contents of the reactor, in the case of discontinuous product discharge, and wherein the polymerization is carried out at an ethylene concentration of at least 10 mol %, based on the suspension medium.

In addition, we have found a process described at the outset wherein the polymerization is carried out at an average solids concentration in the reactor of more than 53% by weight, based on the total mass of the contents of the reactor, in the case of continuous product discharge and at an average solids concentration in the reactor of more than 45% by weight, based on the total mass of the contents of the reactor, in the case of discontinuous product discharge, and wherein the loop reactor used comprises a cyclic reactor tube whose diameter varies by at least 10%, based on the predominant reactor tube diameter, and in which there is at least one widening and narrowing in a region other than that of the axial pump. It is also advantageous if the reactor tube additionally has a widening and narrowing in the region of the axial pump.

The process of the present invention is suitable for polymerizing various olefinic monomers, in particular for polymerizing ethylene, propylene and 1-butene or mixtures of these monomers. It is also possible to use additional monomers as comonomers, e.g. further α-olefins such as 1-pentene, 1-hexene, 1-octene or 1-decene.

Particular preference is given to a process in which ethylene is used as monomer and at least one α-olefin having from 3 to 8 carbon atoms, preferably 1-butene, 1-hexene or 1-octene, is used as comonomer. The amount of comonomer depends on the incorporation behavior of the particular catalyst in respect of the comonomer and on the desired density of the copolymer. The more comonomer incorporated into the polymer, the lower the density of the copolymer will be. A person skilled in the art can readily set the monomer:comonomer ratio on the basis of these considerations.

If the catalyst permits, vinylaromatic comonomers such as styrene or polar comonomers such as vinyl acetate, vinyl alcohols, acrylic acid or acrylic esters can also be polymerized. Cyclic monomers such as norbornene and dienes such as butadiene, 1,5-hexadiene or 1,7-octadiene are also possible as comonomers.

The polymerization process of the present invention can advantageously be carried out at from 20 to 150° C., preferably from 50 to 110° C., with an upper limit being imposed on the reaction temperature by the melting point of the polymer to be formed.

The reaction pressure is usually in the range from 5 to 100 bar, preferably from 10 to 80 bar. Low pressures are generally associated with low space-time yields, while higher pressures require an increased capital investment and lead to higher energy costs for compression. In general, a reaction pressure in the range from 20 to 50 bar represents a good compromise between apparatus cost and reaction yield. When supercritical suspension media such as supercritical propane are employed, a higher pressure above the critical pressure can be appropriate from a technical point of view.

In a preferred embodiment of the process of the present invention, the polymerization is carried out at a pressure of from 43 to 80 bar, particularly preferably a pressure of 45-75 bar. Polymerizations in a loop process are usually carried out at pressures of about 40 bar. An increase in the pressure has little effect. In the process of the present invention with high solids concentrations in the reactor, it has surprisingly been found that an increase in the pressure, in particular to pressures above 43 bar, has a significant influence on the solids concentration which can be increased further by means of the pressure increase. This effect appears to be due to the proportion of suspension medium in the reactor contents becoming so small at high solids concentrations that the process of dissolution of ethylene in the suspension medium becomes a significant factor in determining the polymerization rate. A high ethylene pressure then leads to a higher concentration of dissolved ethylene.

Suitable suspension media for the process of the present invention are all media which are generally known for use in loop reactors. The suspension medium should be inert and be liquid or supercritical under the reaction conditions and should have a boiling point which differs significantly from those of the monomers and comonomers used in order to make it possible to recover the starting materials from the product mixture by distillation. Examples of customary suspension media are isobutane, butane, propane, isopentane, pentane and hexane.

An important feature of the process of the present invention is that it allows polymerization at high ethylene concentrations. High proportions of solids in the reactor, in the present context also referred to simply as "reactor density", result in the proportion of the suspension medium in the reactor being correspondingly lower. In general, the smaller volume of the suspension medium results in the amount of ethylene in the reactor also being lower, which leads to reduced polymer formation. In contrast, the process of the present invention makes it possible to increase the ethylene concentration in the suspension medium and thus achieve higher polymer formation and a higher polymerization rate even at high reactor densities.

In the process of the present invention, the polymerization is therefore carried out at an ethylene concentration of at least 10 mol %, based on the suspension medium. It is preferred to have an ethylene concentration of at least 11 mol %, more preferably at least 12 mol %, even more preferably of at least 13 mol %, most preferably of at least 14 mol %.

Ethylene concentrations of 15 mol % and even 17 mol %, based on the suspension medium, were achieved in the process of the present invention.

In this context, the term "suspension medium" refers not simply to the suspension medium used, e.g. isobutane, but to the mixture of this suspension medium with the monomers dissolved therein. The ethylene concentration can be determined easily by gas-chromatographic analysis of the suspension medium.

As mentioned at the outset, the technology of loop reactors has been known for a long time. In general, these reactors consist essentially of a cyclic reactor tube having one or more ascending and one or more descending segments which are surrounded by cooling jackets for removing the heat of reaction and also horizontal tube sections which connect the vertical segments. The lower tube section usually accommodates the axial pump, preferably an impeller pump, the feed facilities for catalyst and monomer and the discharge device, i.e. generally the sedimentation legs. However, the reactor can also have more than two vertical tube sections, so that a meandering arrangement is obtained.

The present invention makes it possible to carry out a suspension polymerization process in a loop reactor at solids concentrations of more than 53% by weight, based on the total mass of the contents of the reactor, and thus increase the production capacity of the loop reactor. These high solids concentrations can be achieved by various means.

In one embodiment of the present invention, the high solids concentration is achieved by the diameter of the cyclic reactor tube being varied by more than 10%, based on the predominant reactor tube diameter. A widening of the reactor tube in the region of the axial pump necessitated by the construction should not be taken into consideration here, since such a widening serves primarily to accommodate the axial pump, particularly the impeller of an impeller pump, in the reaction tube and highly turbulent flow prevails in this region in any case. Rather, the invention is based inter alia on the observation that, contrary to prevailing opinion, deliberate nonuniform flow of the polymerization mixture in the region of the reaction tube even outside the region of the axial pump makes it possible to increase the solids concentration in the reactor. This effect appears, without wishing to be tied to this hypothesis, to be based on more effective mixing of the heterogeneous reaction mixture. In particular, the monomer fed in, e.g. ethylene, is apparently dispersed more quickly in the reaction mixture, is dissolved more quickly in the suspension medium and is available to a greater degree for the polymerization. The removal of the heat of reaction also appears to be aided, since the disturbance of the flow increases motion perpendicular to the flow direction, i.e. in the direction of the cooled reactor wall, which occurs to only a very limited extent in the case of uniform plug flow.

To be able to influence the flow conditions in this desired way, the reaction tube diameter should be varied to a particular degree. The diameter of the tube should vary by at least 10%, based on the predominant diameter of the reactor tube. For the present purposes, the predominant diameter of the reactor tube is the tube diameter which is constant over the longest stretch of the reactor tube. The tube diameter should preferably vary by at least 20%, even better by at least 30% and very particularly preferably by at least 50%.

The conical widening of the reactor tube diameter in the flow direction should have a cone angle of about 0.5-10°, preferably 0.5-1.5°, and the cone angle at the narrowing of the tube diameter down to the predominant tube diameter should be about 0.5-10°, preferably 1-3°.

The length of the sections having a widened tube diameter is preferably from 2 to 30 times the predominant tube diameter, particularly preferably from 5 to 15 times this tube diameter.

In a preferred embodiment of the process of the present invention, there is also an additional widening and narrowing of the reaction tube in the region of the axial pump. As mentioned above, such widenings necessitated by the construction are already known. The effect of these widenings in accordance with the present invention can, however, be increased by making the widening greater and possibly also extending it over a longer section of the tube than is required by the construction.

The effect of the present invention in terms of enabling the solids concentration in the reactor to be increased appears to be based, inter alia, on better mixing of the monomer in the reaction mixture. It has been found that this inventive effect can be increased by feeding the monomer, i.e. for example ethylene, in at various points along the reaction tube. An advantageous embodiment of the process of the present invention therefore comprises feeding at least one olefinic monomer in at least 2 points along the reactor tube. It has been found to be advantageous for the monomer to be fed in at, for example, 3 or 4 points along the reactor tube. These feed points can be provided uniformly along the reactor tube, and it is advantageous for the feed points to be located in each case upstream of the widenings of the tube, but not in the region of the last vertical segment before the product discharge region.

It is known from U.S. Pat. No. 6,239,235 that a continuous discharge system can also be useful for increasing the solids concentration in the reactor. This measure can be combined with the process of the present invention. Accordingly, the present invention also provides a process as described above in which the polymer formed is discharged continuously from the reactor.

The high solids concentration in the reactor which is sought according to the present invention can, as indicated above, be achieved by the abovementioned means. Particular preference is given to a process in which the polymerization is carried out at an average solids concentration in the reactor of more than 53% by weight, based on the total mass of the contents of the reactor. This solids concentration is preferably above 55% by weight, more preferably above 58% by weight and particularly preferably above 60% by weight. As shown in the examples, solids concentrations of more than 62% by weight can be achieved. For the present purposes, the average solids concentration is then the solids concentration in the reaction tube. Even higher solids concentrations can be observed in the discharge system, whether continuous or discontinuous, due to sedimentation.

The high solids concentrations can be achieved by the measures provided by the present invention even without continuous discharge of the polymer product. One variant of the process of the present invention therefore comprises discharging the polymer formed from the reactor in a discontinuous fashion and carrying out the polymerization at an average solids concentration in the reactor of more than 45% by weight, based on the total mass of the contents of the reactor. Under these conditions, the solids concentration in the reactor is preferably above 50% by weight, particularly preferably above 55% by weight.

The process of the present invention can be operated as a single-stage process, but can also be carried out as a multi-stage cascade process by combining it with further polymerization reactors. One embodiment of the process of the present invention is therefore a process for polymerizing at least one olefinic monomer in a loop reactor, wherein the polymerization in this loop reactor is preceded or followed by at least one further polymerization step in a loop reactor or a gas-phase reactor. Such cascade processes, albeit without the specific features of the present invention, are described, for example, in EP-A-517 868 and U.S. Pat. No. 6,355,741.

Apart from the above-described disturbance of the suspension flow in the reaction tube, a high reactor density can also be achieved by other measures, for example by selection of a particularly suitable catalyst.

Catalysts suitable for use in the process of the present invention are in principle all catalysts which are also used otherwise in loop reactors, i.e., for example, chromium catalysts of the Phillips type, Ziegler catalysts, Ziegler-Natta catalysts or single-site catalysts such as metallocene catalysts. Phillips catalysts have become particularly widespread in loop reactors, and can also be used particularly advantageously in the process of the present invention. Among these catalysts, particular preference is given to those described in the patent applications WO-01/18069, WO-01/17675, WO-01/17676 and WO-01/90204. It has been determined that, surprisingly, that these catalysts make it possible to achieve very high solids concentrations in the reactor, even without the reactor tube of the loop reactor having a varying tube diameter.

The process of the present invention has numerous advantages over processes in which the solids concentration in the reactor is lower: the consumption of suspension medium is lower, the catalyst productivity is greater, the reactor throughput is greater, the space-time yield is greater, without significant additional capital investment being necessary. Since the process also makes it possible to obtain products having a particularly high molecular weight (i.e. low melt flow rates), a higher activation temperature can be utilized for preparing products having an intermediate molecular weight when using Phillips catalysts. Activation at a higher activation temperature generally leads in turn to more active catalysts, so that the resulting polymers have a lower proportion of catalyst residues.

The products resulting from the process of the present invention also display a number of advantages. Compared to conventionally produced products, they display a lower level of catalyst residues (ash), a higher powder density, lower proportions of very fine particles and therefore better handleability. The low proportion of catalyst residues usually also results in more homogeneous products having fewer specks.

The examples which follow illustrate the process of the invention:

EXAMPLES

Preparation of Catalyst A:

The preparation of the catalyst up to the activation step was carried out by the method described in WO 01/90204. Activation was then carried out at 520° C. in the presence of air in a fluidized-bed activator. Fluoride doping was carried out by use of a mixture of the catalyst precursor with 2.5% by weight of ammonium hexafluorosilicate (resulted in a fluoride content of about 1% by weight, based on the total mass of the catalyst) in the activation. For activation, this mixture was heated to 350° C. over a period of 1 hour, maintained at this temperature for 1 hour, subsequently heated to the desired activation temperature of 520° C., maintained at this temperature for 2 hours and subsequently cooled, with cooling below 350° C. being carried out under $N_2$.

Polymerization:

Ethylene was copolymerized with 1-hexene at 104° C. and a pressure of 39 bar using the above-described catalyst in a loop reactor having a reactor volume of 0.18 $m^3$ and an impeller pump as axial pump. Ethylene was fed into the reactor at two points, one shortly before the impeller. Isobutane was used as suspension medium. The isobutane was fed into the reactor at 6 points, including in the region of the impeller pump shaft and the place where the catalyst was introduced. The impeller pump was operated at 1700-1900 revolutions per minute. The product was discharged discontinuously via customary sedimentation legs. Polymerizations were carried out at slightly different ethylene/isobutane ratios, but the resulting product always had a density of about 0.949 g/ccm and a high-load melt index (21.6/190) of about 2.0.

Further polymerization parameters are listed in Table A below:

TABLE A

Polymerizations using the chromium catalyst A

| Experiment No. | 1-A | 2-A | 3-A | 4-A | 5-A | 6-A | 7-A |
|---|---|---|---|---|---|---|---|
| Ethene addition (kg/h) | 33 | 35 | 34 | 33 | 33 | 33 | 33 |
| Isobutane addition (kg/h) | 34 | 31 | 28 | 24 | 19 | 13 | 10 |
| Ethene/isobutane | 0.97 | 1.12 | 1.21 | 1.38 | 1.74 | 2.54 | 3.24 |
| Ethene fraction in suspension medium (mol %) | 9.6 | 11.4 | 12.5 | 14.7 | 16.1 | 16.0 | 15.7 |
| Solids concentration in reactor (% by weight) | 48.0 | 55.2 | 58.8 | 61.2 | 64.8 | 66.9 | 68.8 |
| Productivity (g polymer/g catalyst) | 4300 | 6900 | 7634 | 7752 | 9174 | 9259 | 10989 |
| Powder density (kg/m$^3$) | 480 | 500 | 506 | 513 | 515 | 522 | 516 |
| Fine dust (% by weight of particles <125 μm) | 1.3 | n.d. | n.d. | n.d. | 0.4. | n.d. | n.d. |

Preparation of Catalyst B:

The preparation was carried out like that of catalyst A, but activation was carried out at 600° C. for 10 hours without fluoride doping.

Polymerization:

Ethylene was polymerized with 1-hexene at 102° C. and under conditions indicated in Table B using the catalyst B in a loop reactor having a reactor volume of 32 m$^3$. Isobutane addition and circulation were carried out as in Example A. The conditions were chosen so that a polymer having a density of 0.946 g/cm$^3$ and a high-load melt index (21.6/190) of about 6.0 is formed. It can clearly be seen from the experiments at different pressures that an increase in the pressure has a significant influence on the solids concentration in the reactor.

Preparation of Catalyst C:

The catalyst was prepared as in EP-B1-589350, example 2, but at an activation temperature of 520° C. and an activation time of 5 hours.

Polymerization:

Ethylene was polymerized with 1-hexene at 106° C. in the presence of 0.13-0.14 ppm of carbon monoxide and under the conditions indicated in Table C using the catalyst C in a loop reactor having a reactor volume of 32 m$^3$. Isobutane addition and circulation were carried out as in Example A. The conditions were chosen such that a polymer having a density of 0.954 g/cm$^3$ and a high-load melt index (21.6/190) of about 2.0 is formed.

TABLE B

Polymerizations using the chromium catalyst B

| Experiment No. | 1-B | 2-B | 3-B | 4-B | 5-B | 6-B | 7-B |
|---|---|---|---|---|---|---|---|
| Reaction pressure (bar) | 42.5 | 42.5 | 42.5 | 43.5 | 43.5 | 43.5 | 43.5 |
| Ethene addition (t/h) | 7.1 | 7.1 | 7.2 | 7.0 | 7.0 | 7.0 | 6.7 |
| Isobutane addition (t/h) | 5.3 | 5.5 | 5.5 | 4.7 | 4.7 | 4.7 | 4.5 |
| Ethene/isobutane | 1.34 | 1.29 | 1.31 | 1.49 | 1.49 | 1.49 | 1.49 |
| Ethene fraction in suspension medium (vol %) | 12.0 | 11.7 | 11.7 | 12.4 | 13.5 | 13.5 | 14.4 |
| Solids concentration in reactor (% by weight) | 50.1 | 50.7 | 50.8 | 55.4 | 55.7 | 56.1 | 56.2 |
| Powder density (kg/m$^3$) | 489 | 496 | 485 | 490 | 482 | 480 | 477 |
| Fine dust (% by weight of particles <125 μm) | 1.2 | 0.5 | 0.4 | 0.4 | 0.4 | 0.4 | 0.3 |
| Ash residue (ppm) | 230 | 240 | 235 | 200 | 200 | 200 | 180 |

TABLE C

Polymerizations using the chromium catalyst C

| Experiment No. | 1-C | 2-C | 3-C | 4-C | 5-C | 6-C | 7-C |
|---|---|---|---|---|---|---|---|
| Reaction pressure (bar) | 42.5 | 42.5 | 42.5 | 43.5 | 43.5 | 43.5 | 43.5 |
| Ethene addition (t/h) | 5.1 | 5.1 | 5.0 | 5.0 | 5.0 | 5.0 | 6.0 |
| Isobutane addition (t/h) | 4.6 | 4.5 | 4.2 | 3.4 | 3.4 | 3.4 | 3.7 |
| Ethene/isobutane | 1.11 | 1.13 | 1.19 | 1.47 | 1.47 | 1.47 | 1.62 |

TABLE C-continued

Polymerizations using the chromium catalyst C

| Experiment No. | 1-C | 2-C | 3-C | 4-C | 5-C | 6-C | 7-C |
|---|---|---|---|---|---|---|---|
| Ethene fraction in suspension medium (vol %) | 9.0 | 9.0 | 9.5 | 11.5 | 11.5 | 11.5 | 11.5 |
| Solids concentration in reactor (% by weight) | 51.3 | 51.3 | 51.6 | 57.2 | 57.2 | 57.2 | 57.4 |
| Ash residue (ppm) | 420 | 430 | 380 | 270 | 270 | 270 | 320 |
| Fine dust (% by weight of particles <125 μm) | 0.9 | 1.0 | 1.0 | 0.6 | 0.2 | 0.2 | 0.4 |
| Powder density (kg/m$^3$) | 490 | 486 | 495 | 503 | 500 | 501 | 500 |

Polymerization in the Presence of Catalyst D:

Ethylene was polymerized with 1-hexene at 106.7° C. and under the conditions indicated in Table C using the catalyst D (catalyst 967 BWFL from Grace) in a loop reactor having a reactor volume of 32 m$^3$. Isobutane addition and circulation were carried out as in Example A. The conditions were chosen so that a polymer having a density of 0.954 g/cm$^3$ and a high-load melt index (21.6/190) of about 2.0 is formed.

TABLE D

Polymerizations using the chromium catalyst D

| Experiment No. | 1-D | 2-D |
|---|---|---|
| Reaction pressure (bar) | 42.5 | 46.5 |
| Ethene addition (t/h) | 6.0 | 6.0 |
| Isobutane addition (t/h) | 5.1 | 3.7 |
| Ethene/isobutane | 1.18 | 1.62 |
| Ethene fraction in suspension medium (vol %) | 10.0 | 15.0 |
| Solids concentration in reactor (% by weight) | 50.4 | 59.9 |
| Ashing residue (ppm) | 310 | 220 |
| Powder density (kg/m$^3$) | 475 | 500 |

Polymerization in the Presence of Catalyst E:

Ethylene was polymerized with 1-hexene at 95° C. and under the conditions indicated in Table C using the catalyst E (Ziegler catalyst Sylopol 5951 from Grace) in a loop reactor having a reactor volume of 32 m$^3$. Isobutane addition and circulation were carried out as in Example A. The conditions were chosen so that a polymer having a density of 0.951 g/cm$^3$ and a melt index (2.16/190) of about 6.0 is formed.

TABLE E

Polymerizations using the Ziegler catalyst E.

| Experiment No. | 1-E | 2-E | 3-E | 4-E | 5-E | 6-E |
|---|---|---|---|---|---|---|
| Reaction pressure (bar) | 42.5 | 42.5 | 43.5 | 43.5 | 43.5 | 43.5 |
| Ethene addition (t/h) | 6.0 | 5.5 | 5.5 | 5.5 | 5.5 | 5.5 |
| Isobutane addition (t/h) | 6.2 | 6.0 | 5.3 | 5.3 | 5.3 | 5.3 |
| Ethene/isobutane | 0.97 | 0.92 | 1.04 | 1.04 | 1.04 | 1.06 |
| Ethene fraction in suspension medium (vol %) | 12.5 | 10.4 | 12.2 | 12.1 | 11.8 | 11.7 |
| Solids concentration in reactor (% by weight) | 45.7 | 45.2 | 49.4 | 49.8 | 49.7 | 49.4 |
| Powder density (kg/m$^3$) | 408 | 406 | 415 | 404 | 411 | 415 |

We claim:

1. A process for polymerizing, in a first polymerization, ethylene or a mixture of ethylene with at least one olefinic monomer selected from propylene, 1-butene, 1-pentene, 1-hexene, or 1-octene in a first loop reactor in the presence of a polymerization catalyst at from 20 to 150° C., but below the melting point of a polymer to be formed, and a pressure of from 43 to 80 bar, wherein the polymer formed is present in a suspension in a liquid or supercritical suspension medium, wherein the suspension is circulated by means of an axial pump, wherein the polymerization is carried out at an average solids concentration in the reactor of more than 53% by weight, based on the total mass of the contents of the reactor, in the case of continuous product discharge, and at an average solids concentration in the reactor of more than 45% by weight, based on the total mass of the contents of the reactor, in the case of discontinuous product discharge, and wherein the polymerization is carried out at an ethylene concentration of at least 10 mol %, based on the suspension medium.

2. The polymerization process as claimed in claim 1, wherein the loop reactor comprises a cyclic reactor tube comprising a diameter varying by at least 10%, based on a predominant reactor tube diameter, and in which there is at least one widening and narrowing in a region other than that of the axial pump.

3. The process as claimed in claim 1, wherein the loop reactor comprises a cyclic reactor tube, and wherein there is a widening and narrowing of the reactor tube in the region of the axial pump.

4. The process as claimed in claim 1, wherein the loop reactor comprises a cyclic reactor tube, and wherein the at least one olefinic monomer is fed in at least 2 points along the reactor tube.

5. The process as claimed in claim 1, wherein the polymer formed is discharged continuously from the reactor.

6. The process as claimed in claim 1, wherein the first polymerization in the first loop reactor is preceded or followed by at least one further polymerization step in a second loop reactor or a gas-phase reactor.

* * * * *